United States Patent [19]

Spors

[11] 3,968,892

[45] July 13, 1976

[54] TRAILER

[76] Inventor: Francis L. Spors, 1426 Nobel St., Fairbanks, Alaska 99701

[22] Filed: Aug. 21, 1975

[21] Appl. No.: 606,524

[52] U.S. Cl. .................................. 214/505; 214/85
[51] Int. Cl.² .......................................... B60P 1/04
[58] Field of Search .................... 214/505, 85, 85.1; 296/61; 280/63

[56] References Cited
UNITED STATES PATENTS

| | | | |
|---|---|---|---|
| 3,142,394 | 7/1964 | Schwartz | 214/85 |
| 3,675,800 | 7/1972 | Weyant et al. | 214/85.1 |
| 3,679,081 | 7/1972 | Duncan, Jr. | 214/85 |
| 3,889,827 | 6/1975 | Fine | 214/505 |

Primary Examiner—M. H. Wood, Jr.
Assistant Examiner—Michael J. Forman
Attorney, Agent, or Firm—Dugger, Johnson & Westman

[57] ABSTRACT

Trailer apparatus for hauling small vehicles such as snowmobiles, motorcycles and the like that includes a wheel mounted main frame, a ramp hingedly mounted on the rear part of the main frame for movement between a transport position and a loading position, side frames on transverse opposite sides of the ramp and main frame respectively extending a substantial distance above the ramp and main frame, a spring biased latch on one of the ramp side frames to latchingly engage the adjacent main frame side frame to releasably retain the ramp in a transport position, and fastening mechanism for connecting the adjacent ramp side frame to the main frame side frame to retain the ramp in the transport position independent of the latch.

12 Claims, 3 Drawing Figures

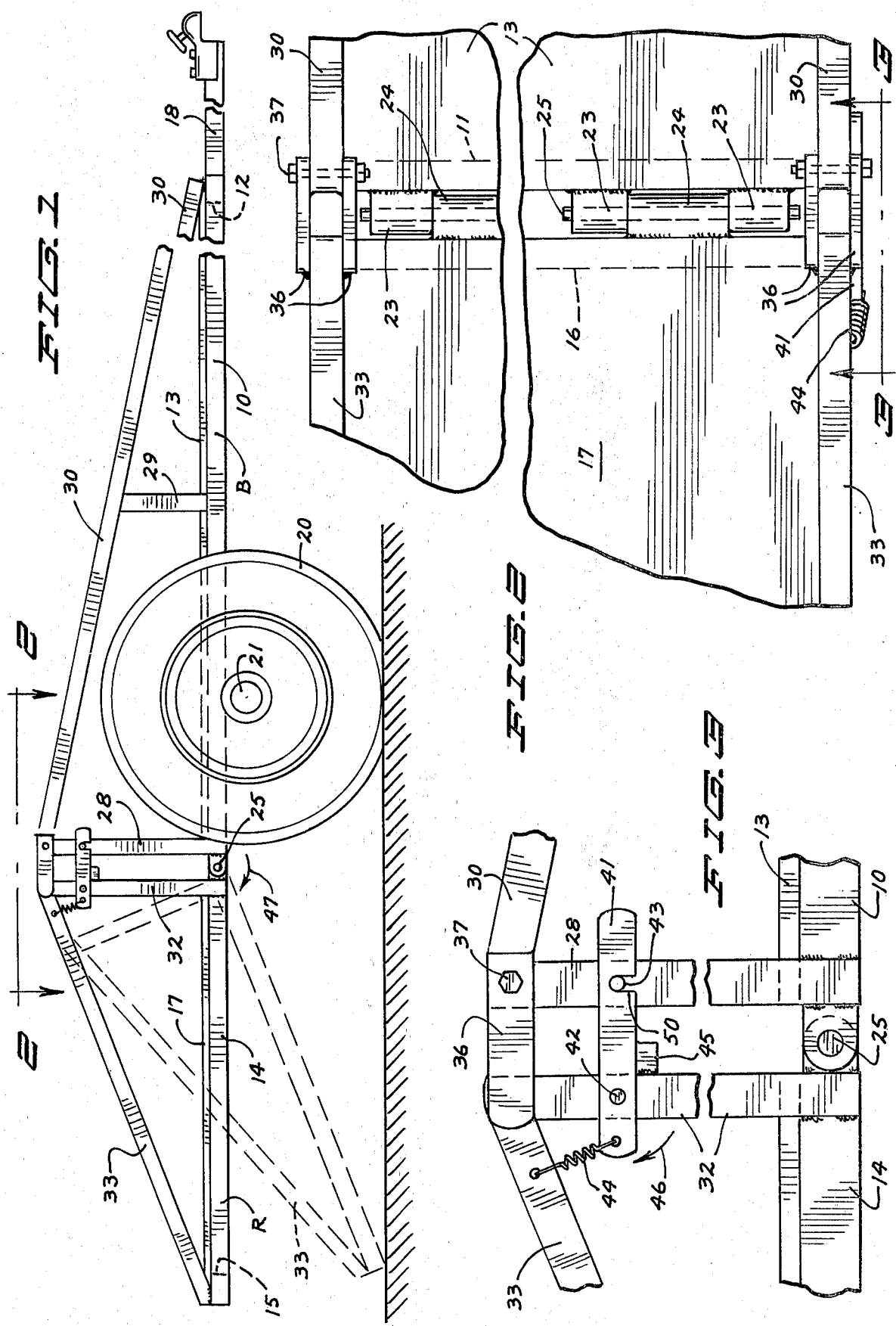

TRAILER

BACKGROUND OF THE INVENTION

A trailer having a loading ramp pivotally connected thereto.

It is old to provide a trailer for transporting small vehicles wherein the trailer has a ramp pivotally mounted for movement between an inclined loading position and a vertical end gate position. However, with such prior art trailers, the ramp does not provide a load carrying function, and for many uses an end gate is not necessary. Thus, such prior art trailers are more expensive to produce than is desirable. To overcome problems such as the above, as well as others, this invention has been made.

SUMMARY OF THE INVENTION

For transporting small vehicles and other loads, trailer apparatus that includes a longitudinally elongated wheel supported main frame; a bed plate on the main frame; a ramp hingedly mounted on the main frame for movement between a downwardly and rearwardly inclined surface engaging, loading position; and a generally horizontal, travel position; and mechanism that at least in part is located at a higher elevation than the bed plate for releasably retaining the ramp in the transport position. One of the objects of this invention is to provide in a trailer having a hingedly mounted loading ramp, new and novel means for releasably supporting the ramp in a generally horizontal transport position. In furtherance of the above object, it is another object of this invention to provide new and novel side frame and latch mechanism that is automatically operable to retain the ramp in its transport position upon the ramp being moved from its loading position to its transport position. In furtherance of the first mentioned object, it is an additional object of this invention to provide new and novel latch mechanism to latchingly retain the ramp in its transport position and fastening mechanism for retaining the ramp in its transport position, even in the event the latch mechanism should become unlatched.

BRIEF DESCRIPTION OF THE DRAWINGS

FIG. 1 is a side elevational view of the trailer of this invention, front portions being broken away, and the ramp being shown in a loading position in dotted lines;

FIG. 2 is a fragmentary plan view of part of the trailer to more clearly show the structure for mounting and releasably retaining the ramp in a transport position, said view being generally taken along the line and in the direction of the arrows 2—2 of FIG. 1; and FIG. 3 is an enlarged fragmentary side elevational view generally taken along the line and in the direction of the arrows 3—3 of FIG. 2.

The trailer of this invention includes a generally rectangular main frame B having a pair of longitudinally elongated frame members 10, a rear transverse frame member 11 joined to the rear ends of the frame members 10, and a front transverse frame member 12 extending between and joined to the front ends of frame members 10. A draw bar 18 has its rearward end connected to the frame B and its forward end mounts a hitch for pulling and connecting the trailer to a motor vehicle such as an automobile. A generally rectangular bed plate 13 is attached to the frame members 10-12 and advantageously is in at least partial overlapping relationship thereto.

An axle 21 is dependently mounted on the frame B, the axle mounting surface engaging wheels 20, one on the other side of the frame B.

Mounted to extend rearwardly of the frame B is a ramp R that includes a generally rectangular frame having a pair of longitudinally elongated frame members 14 and front and rear frame members 16 and 15 respectively extending between and joined to the frame members 14. A ramp plate 17 is mounted by frame members 14-16 to extend into at least partial overlapping relationship to said frame members.

For hingedly mounting the ramp on the bottom frame B, there is provided transversely spaced hinges that includes hinge members 23 that are mounted on frame member 11, hinge members 24 mounted by the ramp frame members 16 and pivot pins 25 that have a transverse horizontal pivot axis for pivotally connecting frame members 23 and 24. Thus, the ramp is mounted for pivotal movement about a transverse horizontal axis from the solid line travel position of FIG. 1 wherein the ramp plate 17 is in substantially the same plane as bed plate 13 and extends rearwardly thereof; and the dotted line loading position of FIG. 1 wherein the rear part of the ramp bears against the surface and is inclined upwardly and forwardly for moving the load to be transported up the ramp and onto the bed plate 13.

Each of the longitudinal frame members 10 mount a side frame that includes an upright 28 having a lower end welded to the rear end of frame member 10 and an upper end that is located at a substantial distance above the bed plate 13 and has one end of a longitudinally elongated frame member 30 mounted thereto. The frame member 30 is inclined downwardly in a forward direction to have its front end mounted to the front end portion of the frame member 10. The frame members 10, 28, 30 on each side are joined to be of substantially a triangular configuration in side elevation. Advantageously, one or more upright braces 29 may be secured to immediate portions of frame member 30 and frame member 10.

Mounted by each of the ramp frame members 14 is a ramp side frame that includes an upright 32 that has its lower end welded to the front end of frame member 14 to extend perpendicular thereto and an upper end that is welded to the front end of the diagonal frame member 33. The frame member 33 is inclined to have its rear end welded to the rear end of frame member 14, the vertical length of frame members 28,32 being substantially the same. When the ramp is in its horizontal travel position, the frame members 28,32 extend vertically in substantially parallel relationship to one another. On each side of the ramp, members 14,32,33 are joined to in side elevation be of a substantially triangular configuration.

Each frame member 33 has the one ends of bars 36 welded to either side thereof. When the ramp is in the transport position, the bars 36 extend horizontally forwardly, one on either side of the adjacent upright 28, for having a bolt 37 extending through appropriate apertures in the bars 36 and the upper end of the upright 28. The opposite end of each bolt has a suitable fastener member mountable thereon, for example a nut threaded on the bolt, or a cotter key extended through the bolt to prevent the bolt from accidentally being dislodged. Members 36, 37 form fastening mechanism for releasably retaining the ramp in a travel position independent of the latch mechanism described hereinafter.

To facilitate fastening the fastening mechanism to retain the ramp in a travel position, there is provided latch mechanism that includes a latch bar 41 that has a rear portion pivotally attached at 42 to an upright 32 on one side of the trailer a short distance below the adjacent transverse outer bar 36. The axis of pivot 42 is parallel to the hinge pivot axis. A coil spring 44 has one end connected to the rear end of the latch bar 41 at a location rearwardly of the pivot 42 and an opposite end connected to frame member 33 for constantly resiliently urging the latch bar to pivot in the direction of arrow 46; there being provided a stop 45 that is mounted on the upright 32 to limit the pivotal movement of the latch bar in the direction of arrow 46 to a latching position substantially parallel to bars 36. The forward end portion of the latch has a downwardly opening notch 50 for having a stud 43 extended thereinto, the stud 43 being mounted to the upright 28 substantially the same distance from bed plate 13 that pivot 42 is located from ramp plate 17.

In using the trailer of this invention, with it hooked to a suitable pulling vehicle such as an automobile, or otherwise supported so that the bed plate is about horizontal, the bolts 37 are removed while a slight lifting force is applied to the ramp R rearwardly of the hinge axis and the latch 41 is pivoted in the direction opposite arrow 46. Now the ramp is lowered or allowed to fall to the incline loading position. Thereafter the vehicle to be loaded is pushed or driven up the ramp so that at least its center of gravity is located forward of the hinge axis. Now the rearward end portion of the ramp is raised, and as the ramp is pivotally moved adjacent to its travel position, either the lower edge or the lower front edge of the latch abuts against stud 43. The further pivotal movement of the ramp in the direction of the arrow 47 results in the stud 43 camming the latch to a position that the latch notch 50 opens to the stud and thereupon spring 47 pivots latch 41 so that the latch front end portion pivotally moves downwardly relative the stud to a position to latchingly engage the stud. As a result, the ramp is retained in its travel position. At this time the apertures in the fastener bars 36 and the upper ends of the uprights 28 are aligned or substantially aligned, and bolts 37 are extended through said apertures and suitable fasteners are provided on the bolts to prevent accidental withdrawal of the bolts. The fastening mechanism 36,37 provides a safety feature for retaining the ramp in a travel position even though the latch bar should accidentally become dislodged from its latching position of FIG. 3. Further, due to the provision of the side frames on the ramp, and their connection to the main frame side frames, part of the weight of the load may be carried on the ramp. For example, if the vehicle to be carried is a snowmobile of a length longer than the bed plate 13, with the snowmobile driven up onto the bed plate so that at least the center of gravity thereof is forward of the hinge axis, the ramp may be moved and fastened in the travel position whereby the ramp will supportingly carry the rear portion of the snowmobile. The provision of the latch mechanism facilitates, or makes it easier for a single person to fasten the fastening mechanism. Suitable mechanism (not shown) may be provided on the front part of the bed plate 13 for securing the front center portions of the snowmobile thereto, or there may be provided a stand for securing a motorcycle in an upright position on the trailer.

As an example of one model's invention but not otherwise as a limitation thereon, the bed plate may be of length about 64 inches, the length of the ramp plate may be about 34 inches, and the height of supports 28,32 may be about 12 inches. Desirably, the axis of rotation of the surface engaging wheels is located longitudinally relative the trailer in its travel condition, closer to transverse frame member 11 than frame member 12, but forwardly of frame member 11.

What is claimed is:

1. Trailer apparatus comprising a longitudinally elongated main frame having a front end portion and a rear end portion, wheel means for supporting the main frame, a loading ramp having a front end portion and a rear end portion, means hingedly connecting the ramp to the main frame rear end portion for movement between a downwardly and rearwardly inclined loading position, and a transport position to extend rearwardly of the main frame in the same general direction as the main frame, first side frame means mounted on the main frame to extend a substantial distance thereabove adjacent the main frame rear portion, second side frame means mounted on the ramp to extend a substantial distance thereabove adjacent the ramp front end portion, and latch mechanism for latchingly connecting the first and second side frame means together at a substantially higher elevation than the main frame rear portion.

2. The apparatus of claim 1 further characterized in that the latch mechanism includes means for automatically latchingly connecting the side assembly means together upon moving the ramp from its loading position to its transport position.

3. The apparatus of claim 1 further characterized in that the latch mechanism includes a first latch member having a first end portion and a second end portion, means for pivotally connecting the latch member first end portion to one of the side frame means for movement between a latching position and a latch release position, and a second latch member on the other of the side frame means for cooperating with the first latch member to latchingly connect the side frame means.

4. The apparatus of claim 3 further characterized in that the first latch member includes an elongated latch bar movable between the latching and release positions and having a downwardly opening notch remote from the pivot means, that the second latch member comprises a stud located in said notch when the first and second side frame means are latchingly connected, and that the latch mechanism includes means for resiliently urging the latch bar to the latching position, and stop means to limit the pivotal movement of the latch bar in the direction from the release position toward the latching position to the latching position.

5. The apparatus of claim 3 further characterized in that there is provided fastening means for selectively connecting the first and second side frame means together when the ramp is in the transport position and acting through the side frame means to retain the ramp in the transport position independent of the latch mechanism.

6. The apparatus of claim 3 further characterized in that first frame means includes a first upright mounted on the main frame rear portion to extend thereabove, that the second frame means includes a second upright mounted on the ramp front portion to extend thereabove, and that the latch mechanism is mounted on the uprights.

7. The apparatus of claim 6 further characterized in that there is provided a draw bar connected to the main frame to extend forwardly thereof, that the uprights have upper end portions, that the ramp side frame means includes a diagonal first frame member connected to the second upright upper end portion and to the ramp rear portion, that the first frame means includes a second frame member connected to the first frame member upper end portion and the main frame front end portion, and that there is provided fastening means for releasably connecting the first frame means adjacent the juncture of the first upright and second frame member to the second frame means adjacent the juncture of the second upright and the first frame member.

8. A trailer comprising a longitudinally elongated main frame having a front end portion and a rear end portion, wheel means for supporting the main frame, a loading ramp having a front end portion and a rear end portion, means for hingedly connecting the ramp front end portion to the main frame rear end portion for movement between a downwardly and rearwardly inclined loading position, and a transport position extending rearwardly of the main frame at substantially the same level as the main frame, first and second uprights having lower ends respectively joined to said main frame rear portion and said ramp front portion, and upper end portions, a diagonal frame member joined to the second upright upper portion and to the ramp rear portion, frame means for connecting the first upright upper portion to the main frame forwardly of the first upright, there being first and second uprights, frame means and a diagonal frame member on each transverse side of the main frame and ramp respectively, and means for releasably connecting at least one of the second upright and diagonal frame member adjacent the juncture thereof on each transverse side to at least one of the first upright and frame means adjacent their connection to one another to selectively retain the ramp in its transport position.

9. The apparatus of claim 8 further characterized in that the releasable connecting means includes a bar having a first end portion fixedly joined to at least one of the second upright and diagonal frame member, and a second end portion, and means for releasably fastening the bar second end portion to one of the first upright and frame means.

10. The apparatus of claim 9 further characterized in that the releasably connecting means includes a latch mechanism for releasably connecting the first and second uprights on one transverse side of the main frame and ramp to one another when the ramp is in its transport position.

11. The apparatus of claim 8 further characterized in that the releasable connecting means includes a latch mechanism for latchingly connecting the adjacent first and second uprights together.

12. The apparatus of claim 11 further characterized in that said latch mechanism includes a latch stud mounted on the first upright, a latch bar having a stud notch, and means for mounting the latch bar on the second upright for movement between a release positon and a stud latching position that the stud extends in said notch, and being moved out of the latching position by the stud as the ramp is moved from its loading position to adjacent its transport position, and thence upon the ramp being moved to its transport position, move the latch to latchingly engage the stud.

* * * * *